Patented June 12, 1951

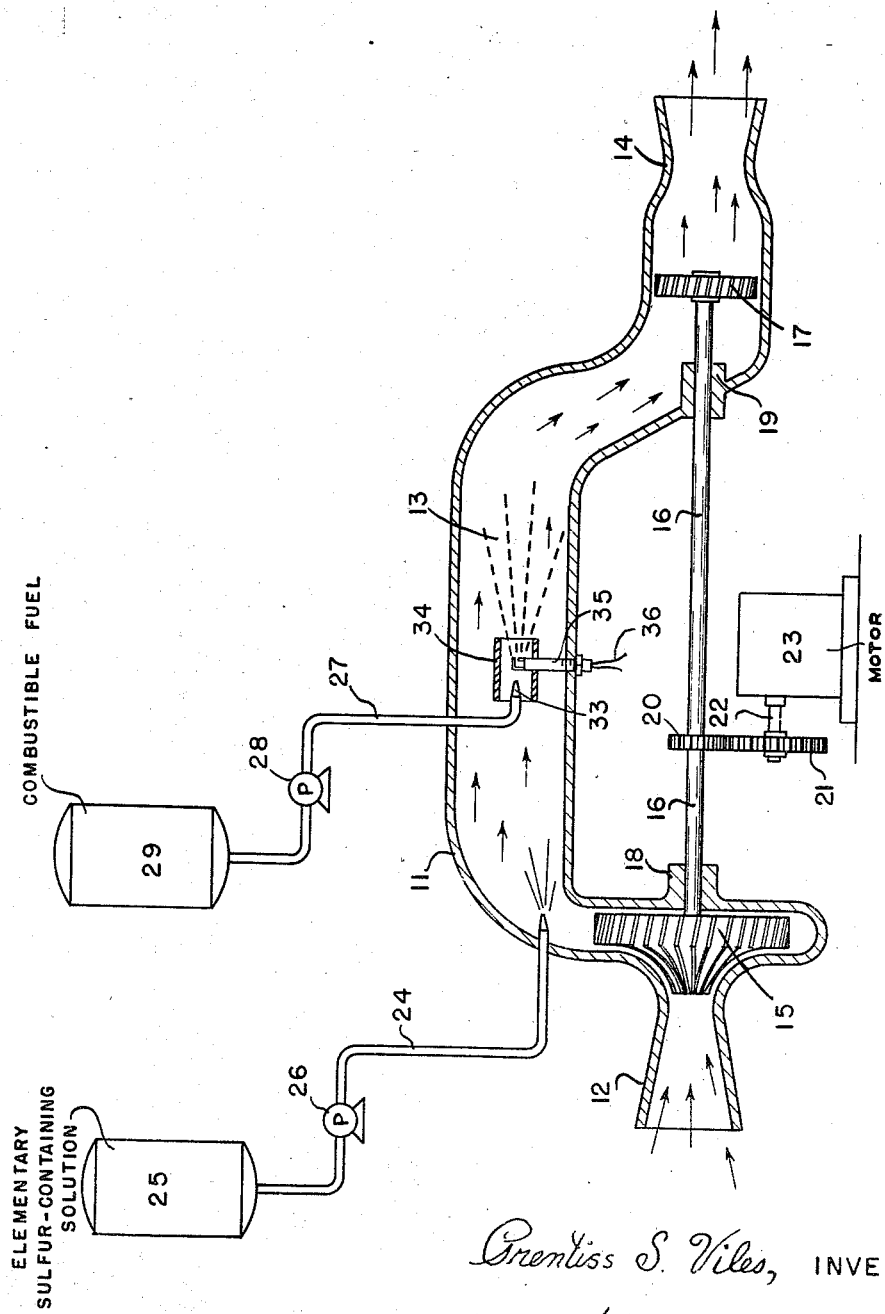

2,557,020

UNITED STATES PATENT OFFICE 2,557,020

USE OF SULFUR IN THE SUPPRESSION OF CARBURIZING IN GAS TURBINE AND JET PROPULSION ENGINES

Prentiss S. Viles, Goose Creek, Tex., assignor, by mesne assignments, to Standard Oil Development Company, Elizabeth, N. J., a corporation of Delaware Application April 26, 1946, Serial No. 665,341

3 Claims. (Cl. 60—35.6)

The present invention is directed to the operation of gas turbine power plants and jet propulsion engines and similar types of power generation equipment. More particularly, the invention is directed to the suppression of carburization and carbon formation in apparatus in which combustion takes place in a zone at a high temperature in the presence of large amounts of oxygen.

Recently the gas turbine type of power plant and the jet propulsion engine employing the turbine principle have been employed in supplying power to fixed installation and to aircraft. In the aircraft jet engine the turbine principle is employed with the jet to give a forward thrust to the aircraft.

One of the major limitations on the operational life of aircraft type jet engines is the carbon formation during the combustion reaction and the subsequent fouling or plugging of integral operating parts such as the fuel jet nozzle, etc. It is also known that the heat resisting qualities of the structural metals, such as exhaust gas turbine blades, etc., limit the operating temperatures of gas turbine power plants. Since the efficiency of this type of power plant is directly proportional to the temperature of the combustion product as it enters the turbine, the heat resisting qualities of the structural metals are of major importance. It is postulated that the heat resisting qualities of the structural metals are related to their carburization qualities. In other words, alloys which carburize readily under the operating conditions fail more rapidly because the products of carburization, i. e., metallic carbides are less resistant than the alloys and are removed allowing the exposure of fresh metal surface for additional carburization. Successive cycles of this type of reaction result in the loss of sufficient metal to cause failure of the metallic part. It is known that ferrous metals and their alloys are excellent carburization agents and catalysts for carbon formation in the presence of high temperatures and hydrocarbons. In view of the potentialities of the exhaust gas turbine power plants and the importance of the above-mentioned limitations, any process which will alleviate or moderate these will be a major improvement in the operation of this type of power plant.

It is, therefore, the main object of the present invention to provide a method whereby the carbon formation and deposition in the combustion chamber and its attendant parts of gas turbine and jet propulsion engines are substantially eliminated. In addition, the method provides for the elimination of the carburization of the metallic parts thereby improving the heat resisting qualities of these parts which in turn allows an increase in the temperature of the exhaust gases.

In accordance with the present invention, carbon formation and carburization of the structural metals employed in gas turbine and jet propulsion engines and the degradation of operating life of the metals employed in these types of engines are substantially eliminated by the injection into the combustion chamber of minor amounts of elementary sulfur. A suitable jet fuel having the above-mentioned desirable properties comprises a major amount (not less than 95 volume per cent) of a hydrocarbon fraction having an approximate boiling range of 250° F. to 500° F. and a minor amount (not more than 5 volume per cent) of elementary sulfur. The amount of elementary sulfur should not be less than 0.1 volume per cent based on the unburned hydrocarbon.

The elementary sulfur may be injected separately into the combustion chamber, with the fuel as a solution thereof, or may be forced into the chamber as a separate stream. If desired, a solution of the elementary sulfur in a volatile, combustible organic solvent other than the fuel may be employed.

The present invention will be better understood from the following detailed description of the drawing in which the sole figure represents a sectional side view of one embodiment of apparatus adapted for use in the practice of my invention.

Turning now to the drawing, the numeral 11 designates a housing which comprises an inlet 12, a combustion chamber 13, and a nozzle 14. Rotary compressor 15 is placed at the back portion of inlet 12 and is attached to a shaft 16. The other end of shaft 16 is connected to turbine 17. Shaft 16 is supported in housing 11 by means of bearings 18 and 19 and contains gear 20 rigidly affixed thereto. Gear 20 meshes with gear 21, the latter gear being connected to shaft 22 of motor 23.

Housing 11 contains two inlet lines having nozzles opening into the area defined by the housing. Inlet line 24 containing pump 26 is connected to tank 25. Inlet 27 containing pump 28 is attached to fuel tank 29. Inlet line 27 having at its lower end nozzle 33 leads into a cylindrical chamber 34 open at both ends. An ignitor 35, such as an electric glow plug, leads from the exterior of housing 11 to the interior of chamber 34. Ignitor 35 may be connected to a suitable source of electric current, not shown, through leads 36.

Tank 29 may contain a suitable combustible fuel, such as a hydrocarbon fraction having a boiling range of 250° to 500° F. The fuel may contain up to about 5 volume per cent of elementary sulfur. Tank 25 may contain a solution of elementary sulfur in the hydrocarbon fuel if it is not desired to inject the sulfur into the area adjacent the ignition plug 35. When high concentrations of elementary sulfur are employed, tank 25 may contain a slurry or suspension of solid particles of sulfur in the hydrocarbon or in a suitable combustible organic solvent. However, for ease of handling and simplification, it will be more convenient to introduce the elementary sulfur as a slurry in an organic liquid or as a solution in an organic liquid or in the hydrocarbon fuel.

In operating the gas turbine, shaft 16 is first rotated by turning on motor 23 and actuating the shaft through the train of gears, such as 20 and 21. The rotation of shaft 16 in turn causes rotary compressor 15 to rotate and draw air or other oxygen-containing gas into combustion chamber 13. The rotary compressor 15 has the effect of drawing in extremely large quantities of the oxygen-containing gas and compressing it to a pressure above the pressure of the gas on the exterior of the turbine. Pump 28 is then switched on and fuel is pumped through line 27 and jet 33 into the compressed gasiform material in combustion zone 13. The fuel is substantially atomized into a fine spray at jet 33 such that it will be thoroughly contacted with the oxygen. Ignitor 35 is heated such that the fuel burns in the presence of the oxygen which results in heating all of the gases in the combustion zone and tremendously increasing the volume thereof. The exhaust gases leaving the combustion zone comprise the combustion products of the burning operation and the unreacted, heated constituents of the gaseous mixture introduced through inlet 12. The exhaust gases force their way at a high velocity through turbine 17 causing it to rotate at a high speed and issue from nozzle 14 at an extremely high velocity.

The rotation of turbine 17 caused by the passage of the exhaust gases therethrough causes rotary compressor 15 to revolve and draw oxygen-containing gas into the combustion zone. After the operation has been started, motor 23 can be switched off and the turbine will continue to drive compressor 15 as long as the burning operation continues. Since the temperature in combustion zone 13 is sufficiently high after the operation has begun to cause spontaneous combustion of the fuel sprayed into the zone, ignitor plug 35 may also be switched off.

Carbon formation tends to be most objectionable around the tips of jet 33, on the walls of housing 34, on the inner walls of housing 11 in the area where the combustion takes place, and on the blades of turbine 17. Therefore, if desired, the elementary sulfur may be injected through line 24 and sprayed into the incoming compressed gas passing into the combustion zone so that the elementary sulfur will contact all areas where the carbon forming and carburization tendencies are greater. Another method which is usually beneficial is to add the elementary sulfur to the fuel contained in tank 29 and spray this material along with the fuel into jet 33 and into combustion chamber 15. This procedure provides adequate protection for the areas affected to the greatest extent and particularly reduces carbon formation and carburization of the nozzle of jet 33 and the walls of the combustion chamber. Obviously, any one or two of the various procedures for injecting the sulfur may be employed in the practice of my invention. My invention is not restricted to the methods by or points at which the sulfur is injected but rather lends itself to any adequate means for introducing the sulfur into the various affected areas in order to prevent carbon formation and carburization of the metallic parts.

In explanation of the advantages obtained from the practice of the present invention it is postulated that the carbon formation and carburization of metal heretofore occurring in the combustion zone are not due entirely to the simple "coking" or destructive distillation of the hydrocarbon fuel but at least in part are the result of the catalytic effect of the ferrous metals or alloys present during the combustion reaction. It is believed that the maintenance of elementary sulfur in the combustion zone in accordance with the present invention poisons the catalytic effect of ferrous metals and alloys within the combustion chamber thus retarding the formation of metallic carbides which in turn suppresses the loss of metal from the combustion chamber due to the combustion reaction. It is to be understood, however, that the above hypothesis is given by way of explanation and is not intended to limit the field of the invention being claimed.

The nature and objects of the present invention having been fully described and illustrated, what I wish to claim as new and useful and to secure by Letters Patent is:

1. In a method for suppressing carbon formation and carburization of attendant metallic parts in gas turbine and jet propulsion engine combustion zones during operation thereof which includes the steps of continuously introducing compressed oxygen-containing gas and a liquid hydrocarbon fuel into said combustion zone, igniting said fuel to form combustion gases and jetting said combustion gases through at least one rotatable turbine and outlet, the step of continuously introducing as a separate stream into said combustion zone between 0.1% and 5% by volume of elementary sulfur based on the unburned hydrocarbon fuel.

2. A method in accordance with claim 1 in which the elementary sulfur is introduced into the combustion zone as a solution in an organic solvent.

3. A method in accordance with claim 1 in which the elementary sulfur is introduced into the combustion zone as a slurry in a fluid vehicle.

PRENTISS S. VILES.

REFERENCES CITED

The following references are of record in the file of this patent:

UNITED STATES PATENTS

| Number | Name | Date |
|---|---|---|
| 1,913,970 | Albers | June 13, 1933 |
| 2,206,594 | Berger et al. | July 2, 1940 |
| 2,263,234 | Cloud | Nov. 18, 1941 |
| 2,310,306 | Miller et al. | Feb. 9, 1943 |
| 2,396,911 | Anxionnaz et al. | Mar. 19, 1946 |

OTHER REFERENCES

"Motor Fuels" by E. H. Leslie, published by The Chemical Catalog Co., Inc., New York, 1923, page 526.